United States Patent [19]

Fisher

[11] Patent Number: 4,860,780

[45] Date of Patent: Aug. 29, 1989

[54] EARTHQUAKE SAFETY VALVE SHUT-OFF

[76] Inventor: Wesley Fisher, 301 N. Brown St., Benton, Ill. 62812

[21] Appl. No.: 224,291

[22] Filed: Jul. 26, 1988

[51] Int. Cl.⁴ .............................................. F16K 17/36
[52] U.S. Cl. ..................................................... 137/45
[58] Field of Search .............................. 137/38, 39, 45

[56] References Cited

U.S. PATENT DOCUMENTS

| | | | |
|---|---|---|---|
| 3,791,396 | 2/1974 | Nelson | 137/38 |
| 4,161,183 | 7/1979 | Berry | 137/39 |
| 4,542,760 | 9/1985 | Flaviani | 137/45 |
| 4,546,660 | 10/1985 | Bujold | 137/45 X |
| 4,742,839 | 5/1988 | Stock | 137/38 |

FOREIGN PATENT DOCUMENTS

| | | | |
|---|---|---|---|
| 150679 | 11/1981 | Japan | 137/45 |
| 97976 | 6/1982 | Japan | 137/45 |
| 121265 | 7/1984 | Japan | 137/45 |

Primary Examiner—Robert G. Nilson
Attorney, Agent, or Firm—Mary Lou Rouhandeh

[57] ABSTRACT

A vibration activated device is provided for closing a utility gas valve. A control lever on the valve is held in the open position by a latch which fits into a latch groove in the end of the control lever of the valve; a spring is attached to the control lever to pull the valve shut when the latch is released. The shock waves of the earthquake move a pendulum which then moves an activator which then moves a pivot arm which moves a latch located thereon to release the valve control lever. When the valve control lever is released, a spring pulls the end of the valve control lever to turn it to the closed position. The device is designed to operate on a valve located in either a vertical or a horizontal pipeline.

3 Claims, 2 Drawing Sheets

EARTHQUAKE SAFETY VALVE SHUT-OFF

BACKGROUND OF THE INVENTION

1. Field of the Invention.

This invention pertains to a device which is triggered by an earthquake to shut off a commercial utility gas valve. The trigger is fastened on the top end of the pendulum so that when the bottom of the pendulum swings the trigger moves back and forth to raise an activator which is attached to a pivot arm. As the pivot arm moves, it moves a latch which releases the control lever on the valve, and a spring pulls the control lever to close the valve.

2. Information Disclosure Statement.

The inventor does not know of any other device by which the movement of the earth during n earthquake would trigger the closing of a commercial utility gas valve.

SUMMARY OF THE INVENTION

This invention features a novel device which serves the purpose of closing a utility gas valve outside of a dwelling or other building when an earthquake strikes. The control lever on the valve is held in the open position by a latch which fits into a latch groove in the end of the control lever of the valve; a spring is attached to the control lever to pull the valve shut when the latch is released. The shock waves of the earthquake move a pendulum which then moves an activator which then moves a pivot arm which moves the latch located thereon to release the valve control lever. When the valve control lever is released, a spring pulls the end of valve control lever to turn it to the closed position. This shuts off the gas at a point outside of the dwelling. It should be located on a valve installed in the gas pipeline between the gas meter and the foundation of the dwelling which is the low-pressure line. This will greatly reduce the risk of fire, explosion or suffocation of occupants if a gas pipeline is cracked or broken inside the dwelling during an earthquake. The device is designed so that it can be used on a valve located in either a vertical or a horizontal pipeline. It is also designed to work well with three different valve sizes: a three-fourths inch valve, a one inch valve and a one and one-fourth inch valve. No alterations of the device are necessary when one of these sizes of valves is used. When the device has been triggered to shut off the gas, it must be reset manually to turn the as back on.

BRIEF DESCRIPTION OF THE DRAWINGS

Further details are explained below with the help of the examples illustrated in the attached drawings in which.

DESCRIPTION OF THE PREFERRED EMBODIMENT.

Figure 1:
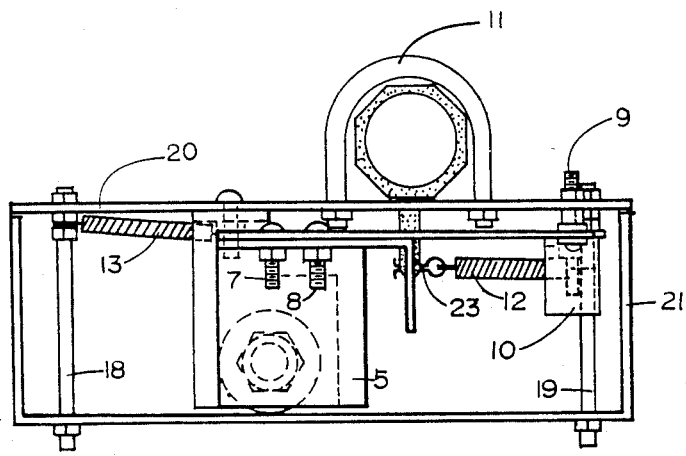
FIG. 1 is a top view of the valve shut-off device showing it located on a valve in a vertical pipeline.

In the drawings, the earthquake safety valve shut-off device is illustrated as located on a commercial gas utility valve 14. Two alterations are made on the control lever of the utility valve 24. First, a latch groove 25 (FIG. 1 and FIG. 4) is made on the end of the valve control lever by removing a semi-circular area about one-sixteenth inch thick from the end of the valve control lever on the side facing the direction in which the valve control lever moves to close the valve. Second, a hole is drilled through the valve control lever. Into said hole a cotter pin 23 (FIG. 2 and FIG. 4) is placed so as to fasten a spring 12 to pull the valve control lever to the closed position when the device is located on a valve in a vertical pipeline or a spring 13 to pull the valve control lever to the closed position when the device is located on a valve in a horizontal pipeline. The commercial valve has a stop made on the valve to stop the control lever when it goes to the full ON position or the full OFF position. In the preferred embodiment, the earthquake safety valve device shut-off is constructed so as to allow the use of valves which fit on any one of three pipe sizes: three-fourths inch, one inch, or one and one-fourth inches.

The base 20 for the device is made of hard material. In the preferred embodiment, the base is constructed of aluminum which is ⅛ inch thick bent at a ninety degree angle at the top and bottom to form an edge at the top and an edge at the bottom; each edge extends approximately three and one-fourth inches from the base. In the preferred embodiment a second piece of aluminum is bent at a ninety degree angle to form two sides which extend approximately three and one-fourth inches from the base. This second piece of aluminum fits over the base to form the cover 21.

Figure 2:
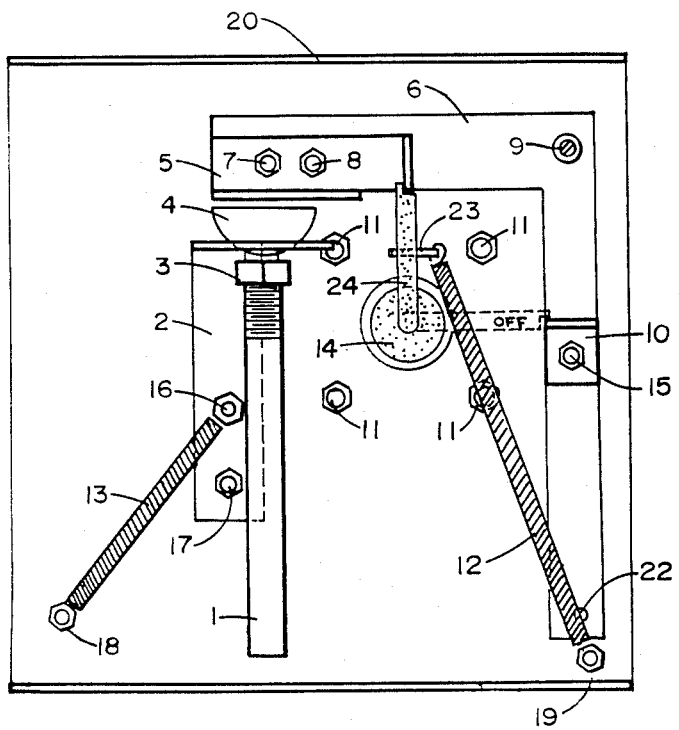
FIG. 2 is a frontal view of the valve shut-off device showing it located on a valve in a vertical pipeline.
Figure 3:
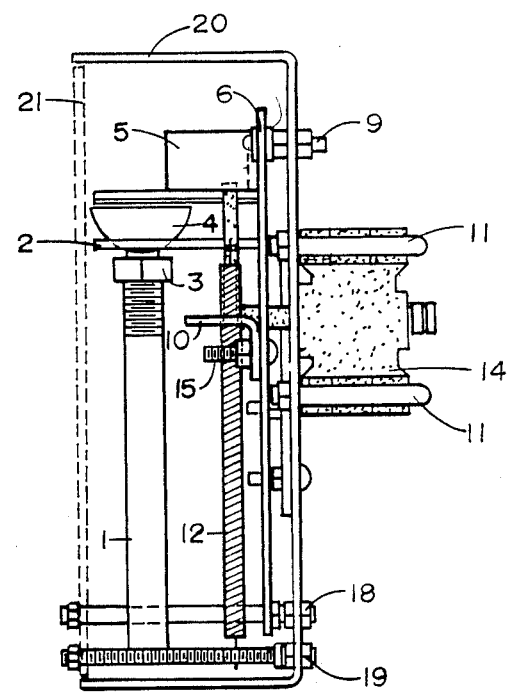
FIG. 3 is a side view of the valve shut-off device showing it located on a valve in a vertical pipeline.
Figure 4:
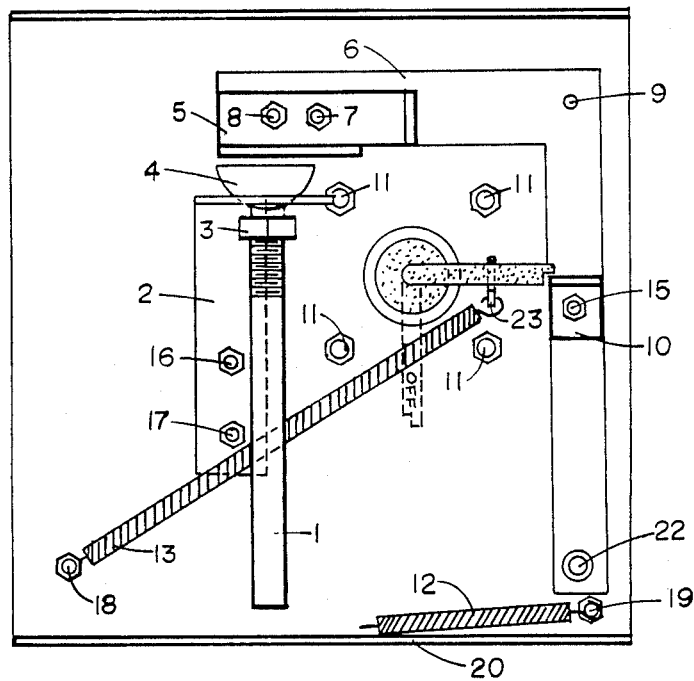
FIG.4 is a frontal view of the valve shut-off device showing it located on a valve in a horizontal pioeline.

The commercial valve is fastened to the base by two U-bolts 11 (FIG. 3). The ends of the U-bolts 11 protrude through a hole in the base to the inside of the device as shown in FIG. 2 and FIG. 4. The holes for the ends of the U-bolts in the base are positioned at equal distances apart so that the position of the U-bolts can be rotated ninety degrees in either direction to enable the device to be located on a valve in either a vertical or a horizontal pipeline. The pendulum 1 is threaded on one end. In the preferred embodiment, the pendulum is a six inch long, one-half inch in diameter steel rod. A lock nut 3 is screwed onto the threaded end of the pendulum, then the trigger 4, consisting of a one-half sphere of any hard substance is then fastened onto the end of the pendulum. In the preferred embodiment the trigger is made of Bakolite. The trigger is fastened onto the end of the pendulum. The trigger is then seated in an aperture in the pendulum bracket 2 and the pendulum is left to move freely as the device is moved or shaken as in an earthquake. The pendulum bracket is bolted to the base 20 with two bolts 16 and 17. Pendulum bracket drill holes in the base are slotted to allow for adjustment of the pendulum bracket so that the pendulum bracket may be raised or lowered as much as one-fourth inch to permit adjustment of the device for location on a valve in either a vertical or a horizontal pipeline. The activator 5 is a hard, flat, plate of aluminum or like material attached to the latch pivot arm 6 by bolts 7 and 8 or other appropriate means of fastening. The activator is located directly above the flat surface at the top of the trigger. The latch pivot arm 6 is made of aluminum or other like material and is shaped to form two sides of a right triangle. In the preferred embodiment, the width of the latch pivot arm is approximately one-half inch, the length of the horizontal side is approximately five inches, and the height of the vertical side is approximately seven inches. The latch pivot arm is secured to the base by a bolt 9 located in the corner where the two sides join when the device is adapted for use on a valve located in a vertical gas pipeline. The latch pivot arm is secured to the base by a bolt 22 located at the end of the latch pivot arm opposite the activator when the device is adapted for use on a valve located in a horizontal gas pipeline.

The latches are made from pieces of aluminum or other like material approximately two inches long, one-half inch wide, and one-eighth inch thick, bent at a ninety degree angle. In the preferred embodiment, the latch for use with a valve positioned on a vertical gas pipeline is made of the same piece of material from which the activator is made by extending the side of the activator which fastens to the latch pivot arm and bending it ninety degrees outward away from the latch pivot arm to function as the latch to hold the valve open when the device is located on a valve in a vertical pipeline. The latch 10 for use on a valve in a horizontal pipeline is fastened to the vertical side of the latch pivot arm by a bolt 15 or other means of fastening centered approximately three and one-fourth inches from the end of the latch pivot arm so as to be directly adjacent to the latch groove on the end of the valve control lever when the control is in the open position.

When the device is located on a valve in a vertical pipeline, the valve control lever 24 is held in the open position by the latch which is positioned flush against the latch groove 25 (FIG. 2). If the pendulum swings sufficiently in any direction to move the trigger so that the upper surface of the trigger is no longer parallel to the activator, the raised edge of the trigger raises the activator causing the latch to raise so that it is no longer positioned in the groove on the end of the valve control lever, thus the valve control lever is released and the spring 12 attached to the valve control lever on one end by the cotter pin 23 and attached to the base at the other end with a bolt 19 or other like fastener pulls the valve control lever in a clockwise direction to close the valve.

In the operation of the device on a valve in a horizontal pipeline, the pivot arm swivels at the far end opposite the activator on a bolt 22. The latch 10 holds the valve control lever in the open position. When the pendulum swings sufficiently to move the trigger sufficiently to raise the activator, the pivot arm swivels on bolt 22 to move the latch away from the latch groove 25 in the end of the valve control lever and allows the spring 13 anchored to the base by a bolt 18 to pull the valve control lever approximately one-fourth turn to close the valve.

In the preferred embodiment, the bolt for the horizontal spring anchor 18 and the bolt for the vertical spring anchor 19 are approximately three and one-half inches long and are also used to secure the cover 21 (FIG. 3) to the base of the device.

In the preferred embodiment, the pendulum bracket is adjusted so as to give one, one-sixteenth inch clearance between the trigger and the activator. This lets the pendulum swing approximately one-half inch before there is any motion of the activator. This amount of swing is sufficient to give a slight hammering effect between the trigger and the activator. The device located on a valve in a vertical pipeline (FIGS. 1, 2 and 3) is altered to operate on a valve in a horizontal pipeline (FIG. 4) by the following steps: (1) remove the spring 12 from the valve control lever 24; (2) remove both U-bolts 11, rotate valve 14 ninety degrees clockwise and reposition U-bolts to fasten base to valve; (3) remove pivot arm anchor bolt 9 (located at the corner of latch pivot arm 6 and place it in drill hole in end of latch pivot arm 22 (FIG. 4)) then secure to base, (4) hook up spring 13 to valve control lever 24 with cotter pin 23.

The shut-off device works equally well for natural gas or propane gas pipeline. On the propane gas pipeline, it should be installed on the low pressure line between the house or other building and the regulator on the propane tank. This device must be installed with the valve in either a horizontal or vertical position to work properly.

What is claimed is:

1. A device to close a gas valve during an earthquake, comprising:
   a. A base of aluminum or other hard material which is fastened to a commercial utility gas valve altered by a latch groove on the end of the valve control lever,
   b. a pivot arm fastened to said base,
   c. an activator fastened to said pivot arm at one end,
   d. at least one latch fastened on said pivot arm in the proximity of said latch groove on the end of said valve control lever when said valve control lever is in the open position,
   e. a trigger which when moved raises said activator,
   f. a pendulum fastened to said trigger at one end which swings to move said trigger,
   g. a pendulum bracket fastened to said base and containing a hole in which said trigger sits,
   h. a control spring fastened to said base at one end and to said valve control lever at the other end, so as to pull said valve control lever to the closed position when said latch is released from said latch groove, and
   i. a means of fastening said base to said valve.

2. A device to close a gas valve during an earthquake according to claim 1 further comprising:
   a. Two U-bolts or other means of fastening said base to said valve in a position whereby said pendulum is perpendicular to said valve when said valve is inserted into a vertical gas pipeline,
   b. the latch being positioned on the horizontal portion of said pivot arm directly above said latch groove in the end of said valve control lever, and
   c. a pivot arm anchor bolt positioned on a corner of said pivot arm so as to raise said latch above said latch groove on said valve control lever when said activator is raised.

3. A device to close a gas valve during an earthquake according to claim 1 further comprising:
   a. Two U-bolts or other means of fastening said base to said valve in a position whereby said pendulum is perpendicular to said valve when said valve is inserted into a horizontal gas pipeline,
   b. the latch being positioned on the vertical portion of said pivot arm directly adjacent to said latch groove in the end of said valve control lever, and
   c. a pivot arm anchor bolt positioned at the end of said pivot arm opposite said activator so as to cause said latch to move outward from said latch groove on said valve control lever when said activator is raised.

* * * * *